(12) United States Patent
Strumpen

(10) Patent No.: US 8,689,027 B2
(45) Date of Patent: Apr. 1, 2014

(54) TILED MEMORY POWER MANAGEMENT

(75) Inventor: Volker Strumpen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 12/640,451

(22) Filed: Dec. 17, 2009

(65) Prior Publication Data

US 2010/0122100 A1    May 13, 2010

Related U.S. Application Data

(63) Continuation-in-part of application No. 12/270,249, filed on Nov. 13, 2008, now Pat. No. 8,271,728.

(51) Int. Cl.
*G06F 1/26* (2006.01)
*G06F 1/32* (2006.01)

(52) U.S. Cl.
USPC .............. 713/320; 713/300; 713/323; 326/39

(58) Field of Classification Search
USPC ..................... 713/300, 320, 322, 323; 326/39
See application file for complete search history.

(56) References Cited

U.S. PATENT DOCUMENTS

| | | | |
|---|---|---|---|
| 5,339,268 A | 8/1994 | Machida | |
| 5,355,345 A | 10/1994 | Dickinson et al. | |
| 5,640,339 A | 6/1997 | Davis et al. | |
| 6,418,525 B1 | 7/2002 | Charney et al. | |
| 6,430,654 B1 | 8/2002 | Mehrotra et al. | |
| 6,763,426 B1 | 7/2004 | James et al. | |
| 6,839,809 B1 | 1/2005 | Forster et al. | |
| 6,996,117 B2 | 2/2006 | Lee et al. | |
| 7,107,399 B2 | 9/2006 | Bilardi et al. | |
| 7,370,252 B2 | 5/2008 | Kim et al. | |
| 7,461,210 B1 | 12/2008 | Wentzlaff et al. | |
| 7,498,836 B1 * | 3/2009 | Tuan | 326/38 |
| 7,805,575 B1 | 9/2010 | Agarwal et al. | |
| 2002/0083266 A1 | 6/2002 | Reuter | |
| 2002/0116579 A1 | 8/2002 | Goodhue et al. | |
| 2002/0188781 A1 | 12/2002 | Schoch et al. | |

(Continued)

OTHER PUBLICATIONS

U.S. Appl. No. 12/270,095, filed Nov. 13, 2008, Strumpen, et al.

(Continued)

*Primary Examiner* — Kim Huynh
*Assistant Examiner* — Michael J Brown
(74) *Attorney, Agent, or Firm* — Mitch Harris, Atty at Law, LLC; Andrew M. Harris; John D. Flynn

(57) ABSTRACT

A tiled memory and a method of power management within the tiled memory provides efficient use of energy within a computer storage, which may be a spiral cache memory. The tiled memory is power-managed by placing tiles in a power-saving state, which may be a state in which storage circuits are powered-down and network circuits are powered-up, so that for serially-connected tiles, information can still be forwarded by a tile in the power-saving state. The tiles may be power managed under direction of a central controlled, which sends commands to the tiles to enter and leave the power-saving state, or the tiles may self-manage their power-saving state according to activity measured at the individual tiles. Activity may be measured at the tiles of a spiral cache by comparing a hit rate and a push back rate to corresponding thresholds. The measurements may be used with either tile-managed or centrally-managed techniques.

25 Claims, 6 Drawing Sheets

(56) References Cited

U.S. PATENT DOCUMENTS

| | | | |
|---|---|---|---|
| 2003/0033500 A1* | 2/2003 | Baxter et al. | 712/11 |
| 2003/0074505 A1 | 4/2003 | Andreas et al. | |
| 2003/0128702 A1 | 7/2003 | Satoh et al. | |
| 2003/0145239 A1 | 7/2003 | Kever et al. | |
| 2003/0236961 A1 | 12/2003 | Qiu et al. | |
| 2004/0148482 A1 | 7/2004 | Grundy et al. | |
| 2005/0114618 A1 | 5/2005 | Lu et al. | |
| 2005/0125702 A1* | 6/2005 | Huang et al. | 713/320 |
| 2005/0132140 A1 | 6/2005 | Burger et al. | |
| 2005/0160132 A1 | 7/2005 | Van Doren et al. | |
| 2006/0143384 A1 | 6/2006 | Hughes et al. | |
| 2006/0212654 A1 | 9/2006 | Balakrishnan | |
| 2007/0022309 A1* | 1/2007 | Adamo et al. | 713/300 |
| 2009/0178052 A1 | 7/2009 | Shen et al. | |
| 2010/0057948 A1* | 3/2010 | Hemmi et al. | 710/20 |
| 2010/0064108 A1 | 3/2010 | Harris et al. | |

OTHER PUBLICATIONS

U.S. Appl. No. 12/270,132, filed Nov. 13, 2008, Strumpen, et al.
U.S. Appl. No. 12/270,186, filed Nov. 13, 2008, Strumpen, et al.
U.S. Appl. No. 12/270,249, filed Nov. 13, 2008, Strumpen, et al.
U.S. Appl. No. 12/264,682, filed Nov. 4, 2008, Li et al.
Bilardi et al., "Optimal Organizations for Pipelined Hierarchical Memories", SPAA '02, Aug. 2002, p. 109-116, Winnipeg, Manitoba, Canada.
Kwon et al., "A Scalable Memory System Design", 10th International Conference on VLSI Design, Jan. 1997, p. 257-260.
Kim et al., "An Adaptive, Non-Uniform Cache Structure for Wire-Delay Dominated On-Chip Caches", ASPLOS X, Oct. 2002, p. 211-222, San Jose, CA.
Baer et al., "On the Inclusion Properties for Multi-Level Cache Hierarchies", IEEE, Feb. 1988, p. 73-80.
Dickinson et al., "A Systolic Architecture for High Speed Pipelined Memories", IEEE, 1993, p. 406-409.
Beckmann et al., "Managing Wire Delay in Large Chip-Multiprocessor Caches", 37th Annual IEEE/ACM International Symposium on Microarchitecture, Dec. 2004, p. 319-330, Portland, OR.
Chishti et al., "Distance Associativity for High-Performance Energy-Efficient Non-Uniform Cache Architectures", 36th Annual IEEE/ACM International Symposium on Microarchitecture, Dec. 2003, 55-66, San Diego, CA.
Dybdahl et al., "An Adaptive Shared/Private NUCA Cache Partitioning Scheme for Chip Multiprocessors", 13th International Symposium on High Performance Computer Architecture, Feb. 2007, p. 2-12, Phoenix, AZ.

Foglia et al, "A NUCA Model for Embedded Systems Cache Design", 3rd IEEE Workshop on Embedded Systems for Real-Time Multimedia, Sep. 2005, p. 41-46, New York, NY.
Huh et al., "A NUCA Substrate for Flexible CMP Cache Sharing", International Conference on Supercomputing, Jun. 2005, p. 31-40, Boston, MA.
Abella et al., "Power Efficient Data Cache Designs", IEEE Computer Society, Oct. 2003, p. 3-8, San Jose, CA.
Gilbert et al., "Variable-Based Multi-Modual Data Caches for Clustered VLIW Processors", IEEE Computer Society, Sep. 2005, p. 3-13, St. Louis, MO.
Gonzales et al., "A Data Cache with Multiple Caching Strategies Tuned to Different Types of Locality", ACM, 1995, p. 338-347.
Lee et al., "Region-Based Caching: An Energy Delay Efficient Memory Architecture for Embedded Processors", CASES, 2000, p. 120-127.
Muralimanohar et al., "Optimizing NUCA Organizations and Wiring Alternatives for Large Caches With CACTI 6.0", 40th Annual IEEE/ACM International Symposium on Microarchitecture, Dec. 2007, p. 3-14, Chicago, IL.
Matteo Frigo. The Weakest Reasonable Memory Model. Master's thesis, Department of Electrical Engineering and Computer Science, Massachusetts Institute of Technology, 1998.
Blumofe, et al., "Dag-Consistent Distributed Shared Memory", Proceedings of the 10th International Parallel Processing Symposium (IPPS), pp. 132-141, Honolulu, Hawaii, 1996.
Molnar, et al., "Counterflow Pipeline Processor Architecture", Technical report, SMLI TR-94-25, Sun Microsystems Laboratories, Inc., 1994.
Akioka, et al., "Ring data location prediction scheme for Non-Uniform Cache Architectures," *International Conference on Computer Design*, Piscataway 2008.
Jin, et al., "A Domain-Specific On-Chip Network Design for Large Scale Cache Systems," *13th International Symposium on High-Performance Computer Architecture (HPCA-13)*, Phoenix, 2007.
Definition of "systole"; Retrieved from http://www.merriam-webster.com/dictionary/systolic on May 10, 2012.
Office Action in 12/270,132 mailed on May 23, 2012.
Office Action in 13/419,143 mailed on Jun. 21, 2012.
Definition of "systole"; Retrieved from http://www.merriam-webster.com/dictionary/systolic on Aug. 23, 2012.
Office Action in 12/640,360 mailed Nov. 20, 2012.
Office Action in 12/640,348 mailed Aug. 29, 2012.
Final Office Action in 12/270,132, mailed on Nov. 28, 2012.

* cited by examiner

TILED MEMORY POWER MANAGEMENT

The present Application is a Continuation-in-Part of U.S. patent application Ser. No. 12/270,249 entitled "SPIRAL CACHE POWER MANAGEMENT, ADAPTIVE SIZING AND INTERFACE OPERATIONS" filed on Nov. 13, 2008. The disclosure of the above-referenced U.S. Patent Application is incorporated herein by reference.

BACKGROUND OF THE INVENTION

1. Field of the Invention

The present invention is related to tiled storage, and more particularly to power management within a tiled storage.

2. Description of Related Art

The above-referenced parent U.S. patent application discloses a tiled memory device in the form of a spiral cache and power management operations within the spiral cache. In general, it is desirable to power-manage all memory sub-systems within a computer system, so that energy is not wasted, and so that available energy is used as efficiently as possible by the different levels of the memory sub-system for system storage needs.

Reducing the power consumption of a semiconductor storage device also typically reduces the operating temperature of the integrated circuit of the storage device, which typically leads to an increase in the lifetime/decrease in the failure rate of the storage device and other circuits integrated with the storage device.

Therefore, it is desirable to provide a power-managed tiled memory and a method of power management within a tiled memory, including power managing individual caches or other tiled storage devices, which may be spiral caches.

BRIEF SUMMARY OF THE INVENTION

The invention is embodied in a tiled memory and method of operation. The memory has multiple tiles with storage locations for storing values, each of which may be a smaller cache memory such as a direct-mapped cache or an associative cache.

Dynamic power management of the multiple tiles is performed in accordance with determinations of tile activity. The determinations may be made external to or internal to the tiles, and the tiles may either automatically enter a power-saving state, or an external unit may sent commands directing one or more tiles to enter a power-saving state. The determination of tile activity may be made by measuring a "hit" rate of accesses to the tiles, and in particular spiral cache embodiments of the invention, a push-back rate of ejection of values from the head of the spiral cache toward the backing store. The hit rate and push-back rate may be compared to corresponding threshold values, and if they fall below the thresholds, an indication that the tile may enter a power-saving state is raised to the external unit or the tile manages to enter a power-saving state itself. The external unit may poll for indications that tile activity is below the threshold, and in response, send commands directing one or more tiles to enter the power-saving state.

In accordance with particular embodiments of the invention, the tiles may comprise network interface circuits and separate storage circuits, and in the power-saving state, the network interface circuits remain active, so that in spiral cache memories and other serially-connected circuits, individual tiles in a power-saving state may be bypassed by having the tiles in the power-saving state forward requests and values through the network circuits while the corresponding storage circuits are powered-down.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses a power management method that may be embodied in a tiled storage device. The tiles may be structurally organized as a spiral that is dynamically partitioned into an active and an inactive portion according to a boundary that may be adjusted on a per-tile basis. The power management control may be determined entirely within the tiles themselves, or an external controller such as the memory interface control may direct the tiles to enter or leave a power-saving state.

Figure 1:
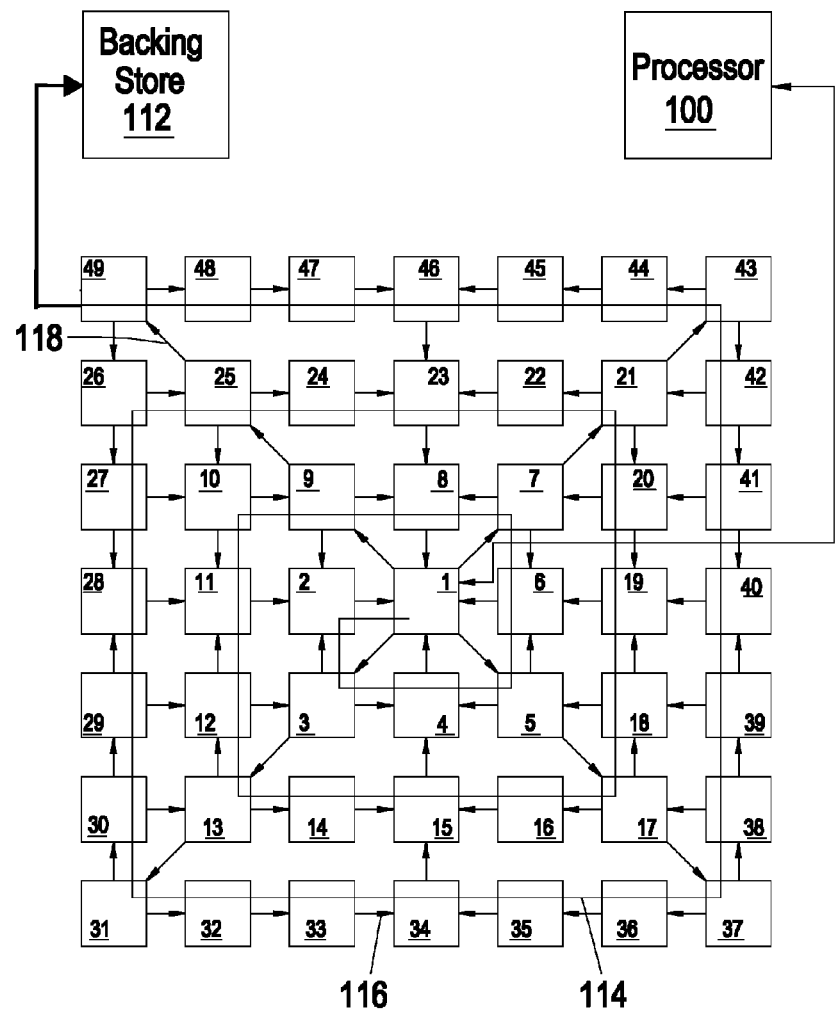
FIG. 1 is a block diagram of a system incorporating a spiral cache according to an embodiment of the present invention.

A tiled storage device in accordance with an embodiment of the present invention is shown in FIG. 1, in the form of a two-dimensional spiral cache. The spiral nature of the exemplary cache can be visualized as a "wrapping" of a linear array around tile 1, such that the linear array now forms an Archimedes spiral with a Manhattan layout. A processor 100, lower-order cache, or other data/instruction sink connects to the front end of the spiral at front-most tile 1. The tail end of the spiral, in the example at tile 49 of the 7×7 matrix of tiles depicted, connects to a backing store 112, which may be a higher-order cache, system memory, disc storage or other data/instruction storage. In general, storage cell contents are continually swapped backwards toward the tail as new values are inserted at the head of the spiral, effectively pushing back the existing contents of the storage cells until an empty cell is encountered or the value stored at the tail end is swapped out into backing store 112. For the spiral cache illustrated in FIG. 1, the spiral network 114 of next neighbor connections is dedicated to the push-back operation. A move-to-front (M2F) network 116 propagates commands, command responses, requests for values and the returned values among the tiles, including power management requests, responses and commands as will described in further detail below. Requests and commands are originated on the diagonal paths 118, where they are received by each tile on the diagonal paths 118. The tiles along the diagonal paths, communicate the power management commands and requests along the x-y pathways formed by M2F network 116, so that each tile receives the power management commands and requests.

Figure 2:
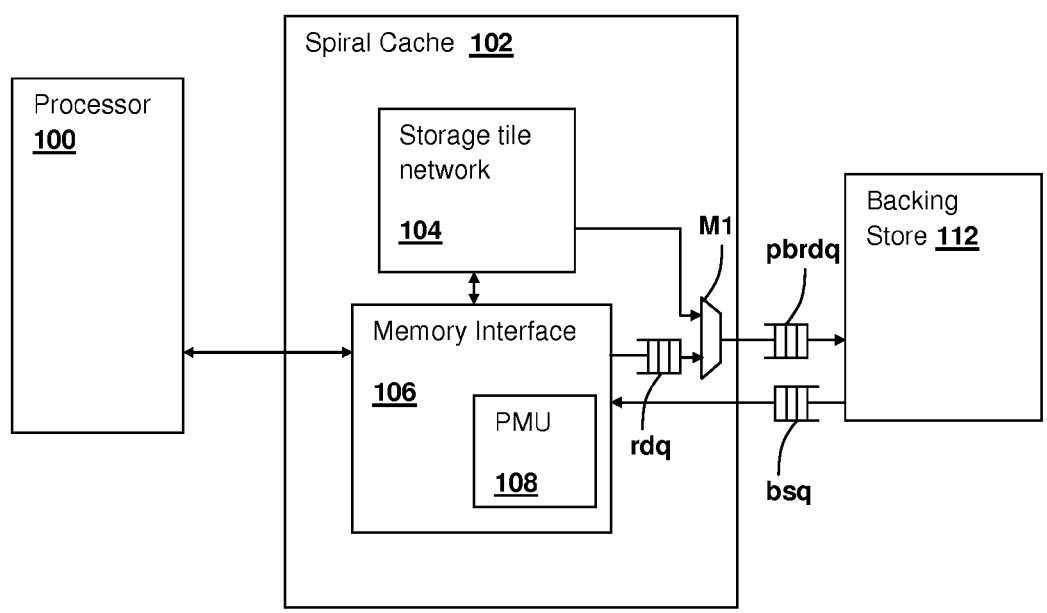
FIG. 2 is a block diagram showing details of a spiral cache according to an embodiment of the present invention.

For some embodiments of the invention, the memory interface that connects the tiled storage device of the present invention to other levels of the memory hierarchy and processors is involved in power management control, as mentioned above. Referring now to FIG. 2, details of a spiral cache 102 in accordance with an embodiment of the invention are depicted, showing a memory interface 106 that includes a power management unit (PMU) 108 for performing power management control in conjunction with power management functions provided by tiles with storage tile network 104. Spiral cache 102 is coupled to processor 100 and to backing store 112. The interface to backing store 112 includes a backing store response queue bsq, which buffers values provided from backing store 112 to spiral cache 102. The interface to backing store 112 also includes a push-back/read queue pbrdq that serializes read requests sent from memory interface 106 to a read queue rdq when spiral cache 102 "misses" and push-back requests containing push-back values leaving the tail tile of storage tile network 104. Multiplexer M1 operates to serialize the push-back requests and the read requests. As will be described in further detail below, the push-back interface to backing store 112 is involved in not only the eviction of values needed when tiles are placed in a power-down or other power-saving state, but also in determining push-back rates, which are used in some embodiments of the invention to determine when the active size of the tiled storage should be changed.

The spiral caches described above provide a large cache memory that has low access latency. Large caches can cope with large working sets, e.g., sets of instructions and/or data associated with a given software process, but large caches waste power when executing for programs having small working sets, as the working sets only occupy a small portion of the cache. The structure of the spiral cache greatly facilitates dynamically adjusting the size of an active cache area to adapt to differing working set sizes. A spiral network imposes a linear structure on arbitrary-dimensional cache designs. The linear structure identifies the head (front-most tile) and the tail for the move-to-front placement algorithm. A move-to-front heuristic has the effect of compacting the working set of a program, or of multiple programs in a multiprogrammed environment, at the head of the spiral. The compaction effect is particularly visible for programs whose working set is smaller than the capacity of the spiral cache. Then, the spiral cache can be divided into two portions, an active portion at the head of the spiral which contains the working set, and an inactive portion at the tail of the spiral in which the storage of the tiles remains unused. The compaction of a spiral cache can be used to reduce the power consumption of a spiral cache. In particular, in very large spiral caches, power consumption can be reduced for processes/programs having small working sets.

Figure 3A:
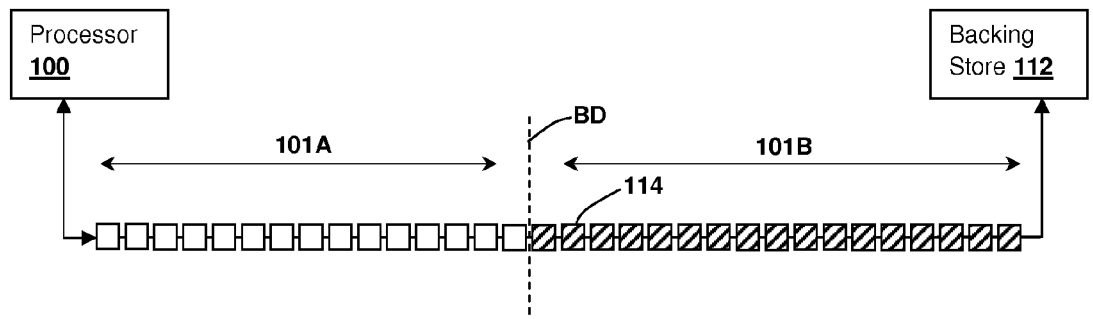
FIGS. 3A and 3B are block diagrams illustrating power management techniques in a spiral cache in accordance with embodiments of the present invention.

Referring now to FIG. 3A, a power management scheme for use in a spiral cache is illustrated, in accordance with an embodiment of the present invention. An active portion 101A of the spiral cache, which is illustrated as a linear array for simplicity, is divided from an inactive portion 101B, by a boundary BD, which can be set on a per-tile basis. Active portion 101A, is the portion closest to processor 100, and the inactive portion 101B is the portion closest to backing store 112. The memory arrays of tiles 114 within inactive portion 101B are placed in a power-down state. In the depicted embodiment, no global control of the position of boundary BD, nor the power-saving/power-down state of active portion 101A and inactive portion 101B is required. Tiles 114 can determine when to enter a power saving state based on activity observed at the tiles themselves, and therefore no external logic or control algorithm is needed. An exemplary algorithm for tile-determined power management will be described in further detail below with reference to FIG. 4. When boundary BD is moved toward processor 100, any values stored in tiles 114 which are entering an inactive state must be ejected to backing store 112 (which may be a next level of cache farther from processor 100).

Figure 3B:
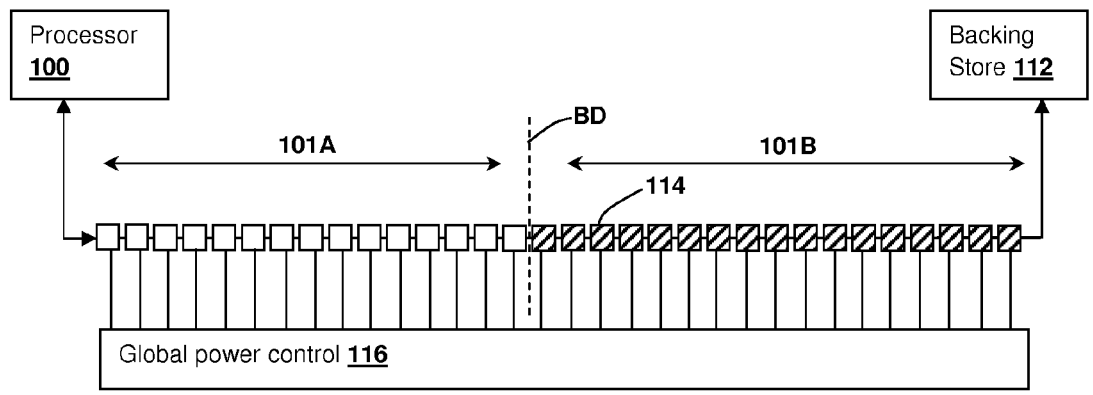

Referring now to FIG. 3B, a power management scheme for use in a spiral cache is depicted in accordance with an alternative embodiment of the present invention. FIG. 3B is similar to FIG. 3A, and therefore only differences between them will be described below. In FIG. 3B, the position of boundary BD is set by a global power control logic 116, which may select the size of active portion 101A in conformity with a priori information or measurements that indicate a size of a current working set, thereby dictating the desired "effective size" of the spiral cache.

In both the embodiment of FIG. 3A and the embodiment of FIG. 3B, multiple power saving levels can be supported, in which the spiral cache is divided into more than two portions, which has advantages when the access latency to activate a tile in a portion that is in an intermediate power saving mode (e.g., low power "sleep" modes) is less than the access latency to backing store 112. If multiple power saving modes are supported in the tiles, the boundaries between the portions can be adjusted on a per-tile basis in a manner similar to that illustrated above for power-down vs. power-up states.

Figure 4:
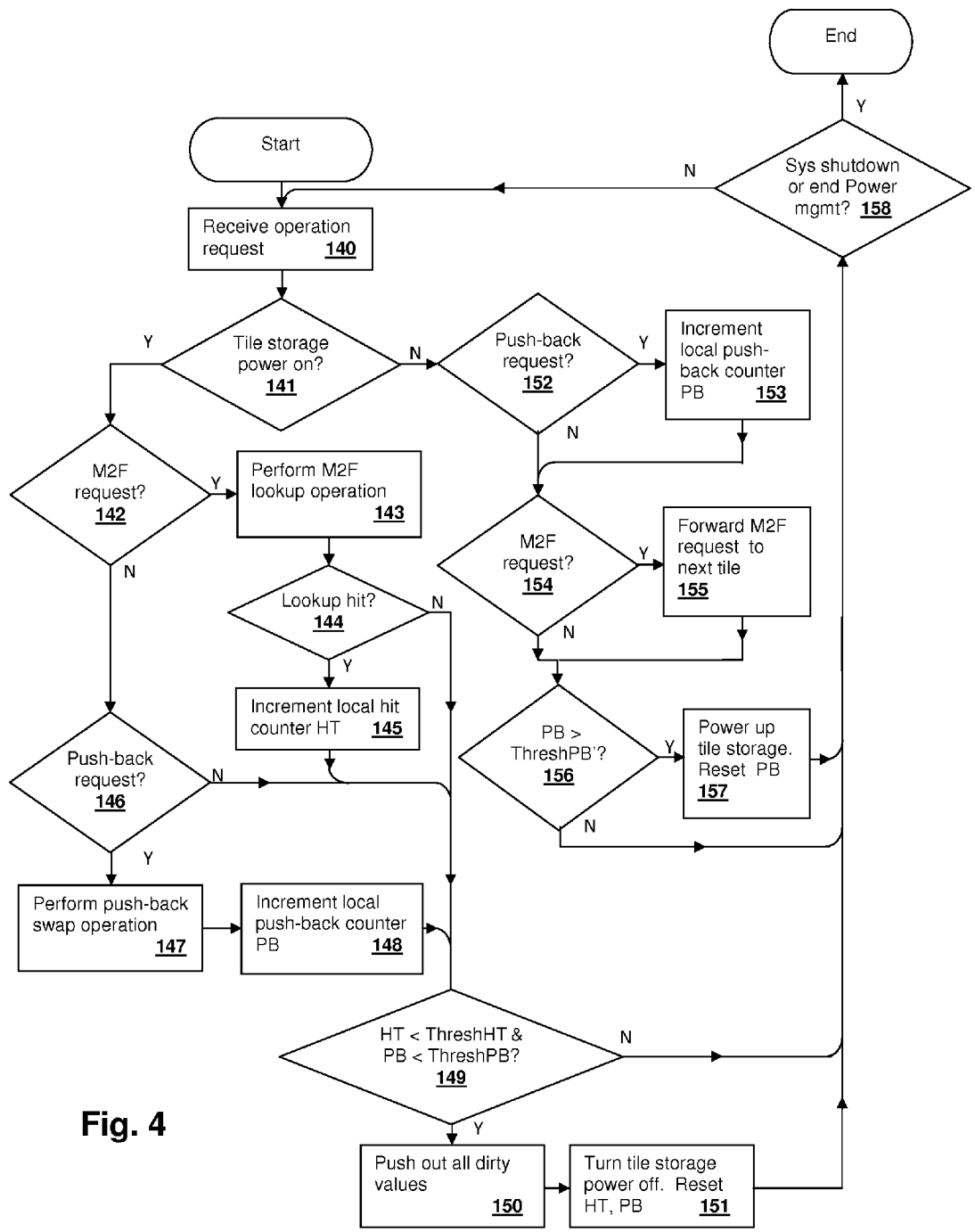
FIG. 4 is a flowchart illustrating a tile-managed power management technique in accordance with an embodiment of the present invention.

Referring now to FIG. 4, an algorithm for the power management of a tile in a spiral cache is illustrated in accordance with an embodiment of the present invention. The algorithm is executed within each tile and toggles the power supply of the tile's memory array between a powered state and an un-powered state. The move-to-front and push-back networks are maintained in an active state. Each tile maintains two counters: a hit counter HT and a push-back counter PB. During each duty cycle, each tile updates the counter implicated by push-back or move-to-front operations for the duty cycle. When an operation request is received (step 140), if the tile's storage is in the in-active (power down) state (decision 141), and if the operation is a push-back request (decision 152), then local push-back counter PB is incremented (step 153). If the request is a M2F request (decision 154) then the M2F request is forwarded to the next-neighbor tiles on the M2F network (step 155). If the value of local push-back counter PB is greater than a first threshold ThreshPB' (decision 156), the tile's storage is powered on, and counter PB is reset (step 157). If the tile's storage is in the active (power up) state (decision 141), and the request is an M2F lookup request (decision 142) the M2F lookup operation is performed (step 143) and if the lookup hits (decision 144), local hit counter HT is incremented (step 145). If the tile's storage is in the active (power up) state (decision 141), and the request is a push-back request (decision 146), the push-back operation is performed (step 147) and local push-back hit counter PB is incremented (step 148). If the tile's storage is in the active (power up) state (decision 141), and if hit counter HT remains below hit threshold ThreshHT while push-back counter PB remains below a second lower push-back threshold ThreshPB (decision 149), all dirty values in the tile's storage are pushed out (step 150) and the storage array in the tile is turned off (step 151). Until the power management operations are suspended or the system is shut down (decision 158), the algorithm of steps 140-157 is repeated at each duty cycle. While FIG. 4 illustrates a technique that can be performed within the individual tiles, in general there will need to be an additional mechanism to: 1) ensure that push-back/read queue pbrdq does not overflow with dirty lines being written back to backing store 112 as a result of the power-down of one or more tiles; and 2) that the power-down and power-up of tiles is performed at a single boundary so that "gaps" are not generated in the cache by a low activity tile surrounded by higher-activity tiles. The first requirement can be met by providing one or more handshaking signals, such as an acknowledgement in response to a push-back of values, so that a tile reconciling dirty values can pace the push-backs to not overflow push-back/read queue pbrdq. Such a mechanism may be provided by a signal indicating that push-back/read queue pbrdq has less than a threshold number of empty entries remaining Another "tile-only management" possibility is to increase the size of push-back/read queue pbrdq by at least the size of a tile's storage array and to allow tiles to power down only at a very long interval, so that a single tile can power-down, reconcile its dirty lines and push-back/read queue pbrdq can empty before the next tile powers-down. The second requirement can be met by status signals provided between adjacent tiles, so that a tile will only power-down if its neighbor on the push-back network toward the tail is already powered-down and so that a tile will only power-up if its neighbor toward the head is already powered-up.

The methodology illustrated in FIG. 4 operates such that when a tile's memory array is powered on, the tile counts the number of hits due to move-to-front lookups and the number of lines received from the spiral network. If the rate of hits and push-ins (over a period of time) is less than a given threshold, the tile does not contribute constructively to the program execution. Thus, the tile should be removed from the active portion 101A of FIG. 3A. Before doing so, all "dirty" data (i.e., data that has been modified from the corresponding value contained in backing store 112) must be evicted. The eviction can be performed by pushing dirty data out towards the tail end of the spiral during duty cycles when the tile does not receive a push-in from the spiral network. When the array does not contain any more dirty data, the memory array can be powered off safely. A tile with a powered-down memory array monitors the push-back activity on the spiral by means of the push-back counter. If the number of push-backs over a period of time exceeds a given threshold, the tile could contribute its memory array constructively to the program execution. In this case, the tile powers up its memory array, and resumes storing push-in data and performing lookups due to requests arriving on the move-to-front network. The algorithm illustrated in FIG. 4 does not employ centralized control of the power-saving state of tiles within storage tile network 104 of FIG. 2. Therefore, in accordance with the embodiment of FIG. 4, PMU 108 of FIG. 2 is not needed and may be omitted. Each individual tile within storage tile network 104 makes an autonomous decision whether or not the individual tile should contribute its storage array to the set of active tiles. However, since placing a tile in a power-saving mode generally requires reconciling the tile's storage with backing store 112, flow control is needed to ensure that push-back/read queue pbrdq is not overflowed when decreasing the active size of the spiral cache.

Dynamic Power Management Implementation As pointed out above with reference to FIGS. 3A-3B, the compaction effect of the move-to-front heuristic provides a basis for dynamic power management, which may be performed on a tile-by-tile basis. The spiral push-back network (e.g., push-back network 114 of FIG. 1) imposes a linear structure on the N tiles of the spiral cache. If tile 1 is at the front/head of the spiral network and tile N is at the tail end of the spiral then, over any time interval the number of push-outs decreases monotonically toward the tail end, that is $n_{po}(t) \geq n_{po}(t+1)$, where $n_{po}(t)$ is the number of push-outs of tile t. The same is not necessarily true for the hit rate of move-to-front lookups. Nevertheless, the monotonicity of the push-outs implies the compaction effect described above. If a working set of one or multiple programs fits within the spiral cache, the working set will occupy a consecutive subset of tiles at the front of the spiral network, i.e., the active tile set described above. The complementary subset of inactive tiles at the tail end does not contribute to program execution, and should be powered off to reduce power consumption due to leakage and any other mechanisms that are removed when the tile's storage is powered-down. Also, if a set of tiles near the tail end of active tile set does not contribute significantly to the program execution, the tiles near the tail end may also be placed in a power-saving state (e.g., the tiles' storage may be powered off) without a noticeable degradation in workload performance. The threshold values ThreshHT, ThreshPB and ThreshPB' employed in the algorithm illustrated in FIG. 4 may be chosen so as to balance the trade-off between workload performance degradation and reduction of spiral cache power consumption.

As pointed out above, the strategy for implementing dynamic power management in accordance with an embodiment of the present invention shifts the boundary between the active and inactive tile sets on a tile-by-tile basis. When a tile at the tail end of the active tile subset detects that it is ready to be powered off, memory interface 106 coordinates a reconcile operation performed on the tile's storage array, in order to prevent overflow of push-back/read queue pbrdq. Once the storage is reconciled, the tile removes power from the internal storage array, effectively moving the boundary between the active and inactive tiles by one tile toward the front of the spiral network. Analogously, powering up the tile at the head of the inactive tile subset moves the boundary by one tile toward the tail of the spiral network. In general, all tiles in a spiral cache may be reconciled by sending a command that "sweeps" the cache for "dirty" values (i.e., those values that have been written-to and are present in the backing store as now invalid values) and writes those dirty values to the backing store by assembling a backing store write operation using the address tag. After the write has been enqueued, the previously dirty value is marked as clean. The functionality required to implement the reconcile operation needed for reconciling a single a tile is identical, with the exception that the command is directed to a single tile only and therefore specifies the tile. Whenever the subset of inactive tiles is non-empty, reconciling the tail tile of the active tile subset requires that its dirty lines reach the backing store. Consequently, the inactive tiles must forward push-back requests received along the spiral network toward the tail of the spiral, even though their storage is inactive. Therefore, the interface/network portion of the tiles remains active while the tiles' storage arrays are powered-down. In the power-saving state, which will be noted below as state PWR_OFF, an individual tile's network interface forwards push-back requests without a need to examine them.

Figure 5:
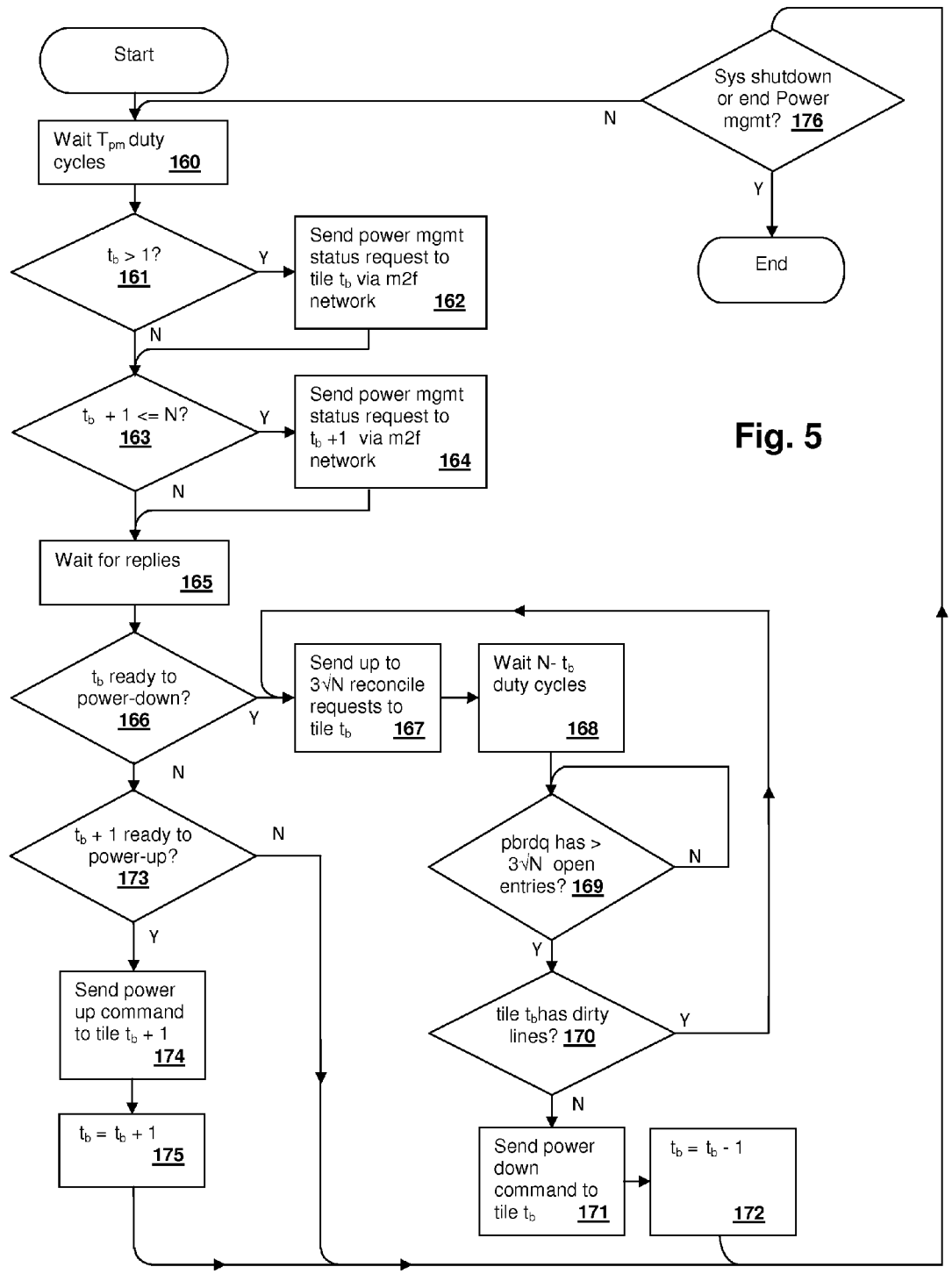
FIG. 5 is a flowchart illustrating a controller portion of a controller-managed power management technique in accordance with an embodiment of the present invention.

Memory Interface Implementation Memory interface 106 of FIG. 2 controls power management actions in a fashion that prevents queue overflows. Referring now to FIG. 5, an algorithm illustrating operation directed by PMU 108 of FIG. 2, is shown in accordance with an embodiment of the invention.

First, a delay of $T_{pm}$ duty cycles is introduced (step 160), where a duty cycle is the systolic cycle during which transfers are made between tiles in the spiral cache, look-ups are performed and read/write operations are completed. $T_{pm}$ is the periodic interval at the end of which power management control is applied, so that the spiral cache is re-sized only periodically. In between the power management control cycles, i.e., during the delay of step 160, the tiles collect usage statistics of their individual storage arrays during normal operation, which may be statistics of individual caches within each tile as described above. However, tile-performed activity measurements are not the only mechanism by which decisions can be made as to power management, as, for example, PMU 108 might send commands powering down a number of tiles based upon workload data that is determined a priori, or in conformity with system level determinations of workload needs. When the next power management control cycle commences, if the index of the tail tile $t_b$ of the active subset is greater than one, i.e. if any tile other than the frontmost tile is active (decision 161), then a power management status request is sent to tile $t_b$ over the M2F network (step 162). Next, if the index of the head tile $t_b+1$ of the inactive subset is less than or equal to N, i.e. if any tile is inactive (decision 163), then a power management status request is sent to tile $t_b+1$ over the M2F network (step 164). The algorithm then waits a predetermined number of cycles (depending on N) for the replies to the power management requests to return (step 165). If a response indicates tile $t_b$ is ready to power-down (decision 166), then up to $3\sqrt{N}$ reconcile requests are sent to tile $t_b$ (step 167), and a wait of $N-t_b$ duty cycles is completed to ensure that any outstanding push-back and read requests ahead of the reconcile requests have time to complete (step 168). A check of open entries in push-back/read queue pbrdq is performed to determine whether to continue to wait (decision 169), and once the number of open entries is equal to the number of reconcile requests sent (e.g., $3\sqrt{N}$), tile $t_b$ is checked to determine if there are any dirty lines (decision 170). If dirty lines remain in tile $t_b$ (decision 170), steps 167-170 are repeated until all of the dirty lines are reconciled. Then, a power down command is sent from PMU 108 to tile $t_b$ directing tile $t_b$ to power-down its internal storage array, generally by switching off one of the power supply rails provided to the memory cells. The value of $t_b$ is decremented (step 172) and until the system is shut down or the power management control algorithm is halted (decision 176) step 160 is entered to wait $T_{pm}$ duty cycles until the next power management cycle is commenced.

If tile $t_b$ is not ready to power-down (decision 166), then if the response to the power management status request sent to tile $t_b+1$ indicates that tile $t_b+1$ is ready to power-up (decision 173), then a power up command is sent from PMU 108 to tile $t_b+1$ directing tile $t_b+1$ to power-up its internal storage array (step 174). The value of $t_b$ is incremented (step 175) and until the system is shut down or the power management control algorithm is halted (decision 176) step 160 is entered to wait $T_{pm}$ duty cycles until the next power management cycle is commenced. When a storage array in a tile is powered-down, the network interface circuits of the tile are placed in a "push-back forward mode", in which push-back requests are forwarded through to the next tile in the direction of the tail of the cache. When a storage array in a tile is powered-up, the network interface circuits of the tile are placed in a "push-back swap mode", which is a normal push-back operating mode which the values within push-back requests are swapped backward into the next tile in the direction of the tail of the cache.

Figure 6:
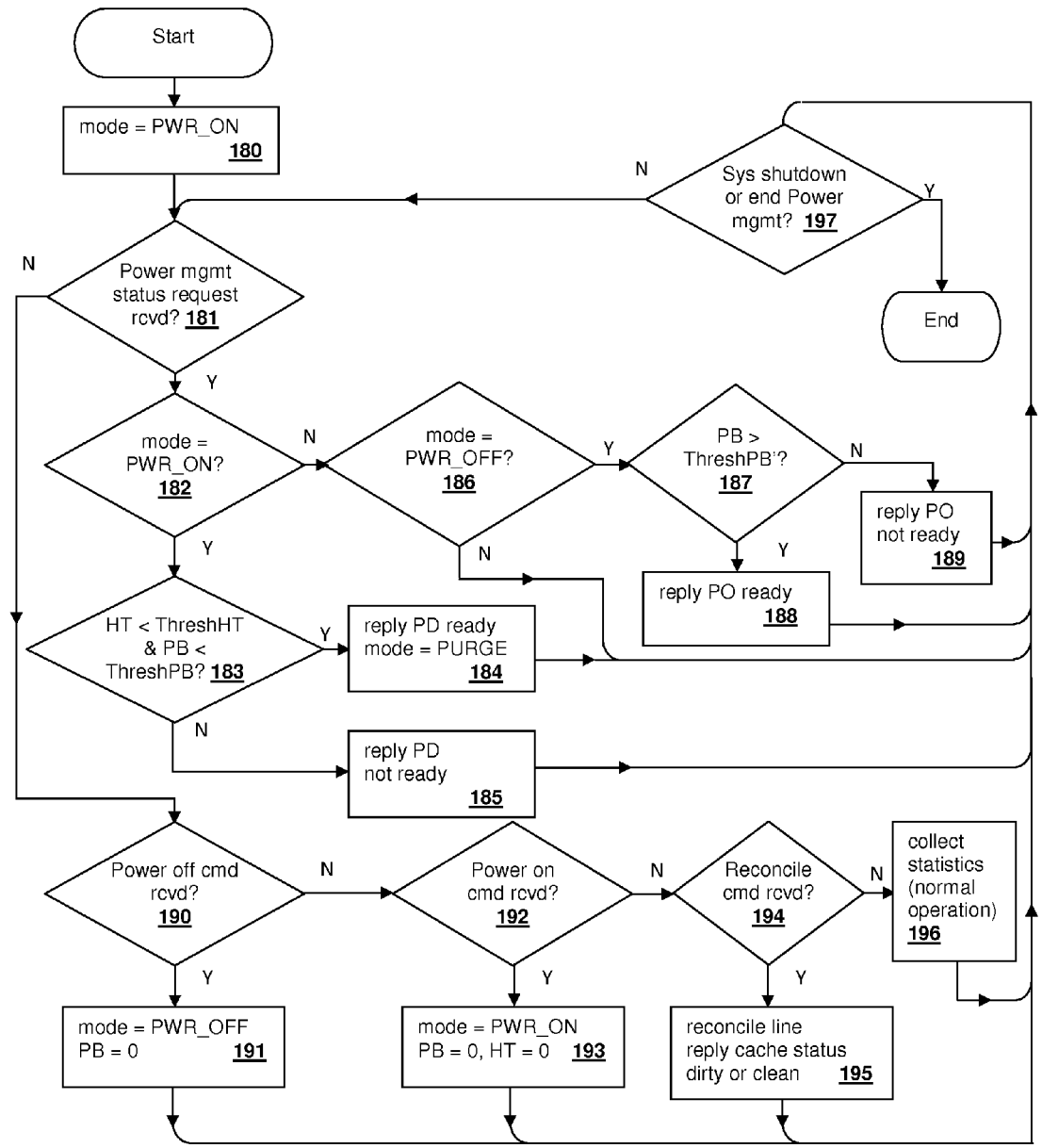
FIG. 6 is a flowchart illustrating a tile portion of the controller-managed power management technique illustrated in FIG. 5.

The algorithm illustrated in FIG. 5 provides only a portion of the power management functionality. Referring now to FIG. 6, a tile-performed portion of the power management control algorithm is illustrated. In the illustrated embodiment, the tiles receive the power management commands via the M2F network. However, a separate network could be employed. A field within the power management commands distinguishes them from move-to-front requests and other cache commands. The address field (or alternatively another field) of the command is used to contain the target tile identifier or index, so that other tiles can ignore/discard the command. A tile ressponding to a power management status request command places the response data in a data field of the command, turning the command/request into a response/reply. As long as only one tile responds, a collision free reply protocol is maintained, due to transmission of only one power management command per systolic cycle. Except for frontmost tile 1, there is a control unit within each tile in the exemplary cache of the illustrated embodiment that executes the following algorithm. Queue overflow is prevented by PMU 108 directing every activity except for the collection of usage statistics within the individual tiles. When the storage device is initialized, the storage array in each tile starts in the powered-up PWR_ON mode (step 180). If a power management status request is received by the tile (decision 181) then if the tile is in mode PWR_ON (decision 182) and if hit counter HT remains below a hit threshold ThreshHT while push-back counter PB remains below a push-back threshold ThreshPB (decision 183), then the tile replies with a power-down (PD) ready response and sets its internal mode to PURGE (step 184). Otherwise if hit counter HT exceeds threshold ThreshHT or push-back counter exceeds push-back threshold (decision 183) then the tile responds with a PD not ready response (step 185). If a power management status request is received by the tile (decision 181) then if the tile is in mode PWR_OFF (decision 186), if push-back counter PB stays below push-back threshold ThreshPB (decision 187), then the tile responds with a power-on (PO) not ready response (step 189). If push-back counter PB exceeds push-back threshold ThreshPB (decision 187), then the tile responds with a PO ready response (step 188).

When a power-off command targeting a tile is received by the tile (decision 190), then the tile sets its mode to PWR_OFF and powers down the internal storage array, push-back counter PB is reset to zero (step 191). When a power-on command targeting a tile is received by the tile (decision 192), then the tile sets its mode to PWR_ON and powers on the internal storage array, push-back counter PB and hit counter HT are reset to zero (step 193). If a reconcile command is received by the tile (decision 194), then a detected dirty line is reconciled (unless the entire tile is clean) and the tile replies with its current dirty/clean status (step 195). The tile continues to collect usage statistics under normal operation (step 196) until the system is shut down or the power management scheme is ended (decision 197). Step 196 includes steps 140-148 and steps 152-155 of FIG. 4, omitting the comparisons of hit counter HT and push-back counter PB, along with the tile-performed power management actions of steps 149-151 and 156-157.

As noted above, a tile is in one of three power management modes: 1) PWR_ON, 2) PWR_OFF, and PURGE. PURGE is an intermediate state occurring between mode PWR_ON and PWR_OFF while cache lines are being reconciled. There is no intermediate state when transitioning from PWR_OFF to mode PWR_ON. Depending on the type of dynamic power management command received on the move-to-front network, the tile performs different actions. When the tile is in mode PWR_ON, a power management status request is interpreted as an inquiry into whether the tile is ready to power off its internal storage array, according to the usage statistics that have been collected. The tile compares the values in its hit counter HT and its push-back counter PB against thresholds ThreshHT and ThreshPB to make the requested decision. Simulations suggest that the following choices of time interval and thresholds yield satisfactory results:

$$T_{pm} = 2^{13} \div 2^{20} \text{ duty cycles}$$

$$ThreshHT = 2^{-10}$$

$$ThreshPB = 4 \cdot ThreshHT$$

With the above values, the predicate in decision 183 of FIG. 6 becomes:

$$\frac{HT}{T_{pm}} < ThreshHT \wedge \frac{PB}{T_{pm}} < 4ThreshHT$$

If the predicate is true, the tile cache contributes so little to the current workload processing computation that it may be powered off. The tile transitions into state PURGE, and waits for reconcile requests from the memory interface. If a tile is in mode PWR_OFF when receiving a power management status request, it replies with whether the collected usage statistics indicate that its internal storage array should be powered on. With the assignments made in the equations above, the predicate in decision 187 of FIG. 6 becomes:

$$\frac{PB}{T_{pm}} > 8ThreshHT,$$

which essentially sets ThreshPB' to 2*ThreshPB. Doubling the threshold for the push-back rate to 8 ThreshHT compared to the power-down decision of 4 ThreshHT prevents the tile from thrashing. If the predicate is true, the tile has forwarded sufficiently many cache lines on the push-back network for it to contribute to the computation by powering up. When a tile receives a reconcile request from the memory interface, it is in mode PURGE in the process of transitioning from PWR_ON to PWR_OFF. The memory interface throttles the reconcile requests such that the tile can push a dirty line out via the push-back network without any danger of overflowing the pbrdq queue, that connects the spiral cache to the backing store. In response to reconcile requests, the tile uses a line detector, to detect and identify a dirty line to reconcile. It replies to the memory interface with a status indicating whether its storage array contains any more dirty lines.

Special Power Management cache instructions The dynamic power management techniques depicted in FIGS. 5-6 are expected to provide a default mode of operation for a spiral cache in accordance with an embodiment of the invention. However, there are other possibilities for power management that extend beyond the basic requirements, that provide for fine-tuning and more explicit control of power management within the spiral cache. Such commands may include a command for activating and de-activating the dynamic power management scheme, setting values of thresholds ThreshHT and ThreshPB, and a command to set the maximum size $N_{pm}$ of the set of active tiles. Enabling and disabling dynamic power management on or off may be desirable for functional and performance debugging purposes, although simulations have shown that dynamic power management does not cause noticeable performance degradation. A command to assign hit threshold ThreshHT provides a control by which a designer or operator of a system may optimize the tradeoff between power consumption and cache performance. For users and software developers, it can be beneficial to constrain the number of active tiles explicitly with an instruction. For example, if a program is known to exhibit an exponentially decreasing hit rate over the tiles along the spiral network, reducing the number of active tiles beyond those selected by the dynamic power management may well reduce leakage power without impacting program performance. Another example would be a user's decision to save power at the expense of performance, which is a common decision made in operating battery powered devices.

An example algorithm for reducing the number of active tiles to a value specified in an instruction can be provided as illustrated in the following pseudo-code:

```
for t = t_b; t >= N_pm; t = t - 1 do
    repeat
        send up to 3√N reconcile requests to tile t
        wait for N - t duty-cycles for potential push-backs to enter pbrdq
        wait until pbrdq has at least 3√N open entries
    until tile t has no dirty lines
    command tile t to power-off internal storage and switch into
    push-back forward mode
    t_b ← t_b - 1
end for
```

Of the above-listed cache instructions, only the command to set the maximum size of the set of active tiles requires a change in memory interface 106 so that storage is provided to store the maximum size $N_{pm}$ of the active tile subset. A persistent copy of maximum size $N_{pm}$ is retained since in the method of FIG. 5, step 163 should compare the value of $t_b+1$ with the maximum size $N_{pm}$ of the active tile subset, rather than the total number of tiles N. Furthermore, when the instruction to set the maximum size $N_{pm}$ is executed, and the tile boundary $t_b$ is larger than $N_{pm}$, memory interface 106 executes the above algorithm to power-down all tiles beyond the new limit $N_{pm}$.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of power management within a tiled storage device comprising a plurality of tiles for storing values, wherein the storage device comprises an internal network for communicating the values among the tiles, and wherein the tiles include network circuits for interfacing with the internal network, and storage circuits for storing the values, the method comprising:

within the storage device, transferring the values between the tiles according to a movement heuristic over the internal network, wherein the internal network automatically transfers the values according to the movement heuristic to provide vacant storage locations for other values written to the tiled storage device from an external device;

within the tiles, measuring activity levels at the individual tiles, wherein the activity levels are reflective of rate of the transfer of values between the individual tiles and other tiles over the network;

determining, within the individual tiles, whether or not the activity level at the individual tile is greater than or equal to a threshold;

responsive to determining that the activity level at the individual tiles is greater than or equal to the threshold, maintaining the individual tiles in a fully active state, in which the values are written to and retrieved from in the storage circuits, and in which the values stored in the tiles that are in the fully active state are transferred according to the movement heuristic to be stored in next tiles; and responsive to determining that the activity level at the individual tiles is less than the threshold, placing the storage circuits of individual tiles in a power-saving state, in which the values are not stored in the storage circuits, and maintaining the network circuits in an operational state, whereby the values are communicated through individual tiles that are in the power-saving state, so that the values transferred according to the movement heuristic bypass the tiles that are in the power-saving state without being stored in the tiles that are in the power-saving state.

2. The method of claim 1, wherein the tiles have a linear organization with a head and a tail, and wherein when the individual tiles are in the power-saving state, the individual tiles forward push-in requests to a next tile toward a tail of the tiled storage device.

3. The method of claim 1, further comprising:
sending power management status requests to the individual tiles to query the individual tiles as to whether the determining has determined that the activity of the individual tiles is less than the threshold and therefore the individual tiles are ready to enter the power-saving state; and
sending responses from the individual tiles indicating whether or not they are ready to enter the power-saving state.

4. The method of claim 3, wherein the individual tiles also send messages indicating whether or not they are ready to leave the power-saving state.

5. The method of claim 4, further comprising responsive to receiving a message that a corresponding tile is ready to leave the power-saving state, sending a command to the corresponding tile to leave the power-saving state.

6. The method of claim 1, further comprising:
responsive to receiving a response that a corresponding tile is ready to enter the power-saving state, sending multiple requests to the corresponding tile to push-back dirty values to a backing store interface; and
sending a command to the corresponding tile to enter the power-saving state, and wherein the placing the individual tiles in the power-saving state is further performed only in response to receiving the command.

7. The method of claim 6, further comprising:
subsequent to the sending of the multiple requests to the corresponding tile to push-back dirty values, waiting a predetermined period for the dirty values to enter a push-back queue; and
determining whether the push-back queue has a predetermined number of open entries, and wherein the sending a command is performed only in response to determining that the push-back queue has a predetermined number of open entries after the multiple requests have been sent.

8. The method of claim 1, wherein the activity level at the individual tiles is a corresponding hit rate of the individual tiles and the threshold is a hit threshold.

9. The method of claim 8, wherein the determining further determines whether a corresponding push-back rate at the individual tiles is less than a push-back threshold, and wherein the placing places the individual tiles in the power-saving state only if their corresponding push-back rate is less that the push-back threshold in addition to the corresponding hit rate being less than the hit threshold.

10. The method of claim 1, wherein when the individual tiles are in the power-saving state, the individual tiles further determine whether or not to leave the power-saving state by measuring an activity level of the network circuits in the individual tiles and compare the activity level to an inactivity threshold.

11. The method of claim 10, wherein the activity level at the individual tiles while the individual tiles are in the power-saving state is a corresponding push-back rate of the individual tiles and wherein the inactivity threshold is a push-back threshold.

12. A storage circuit, comprising:
a plurality of storage tiles for storing values, wherein the individual storage tiles comprise one or more storage locations and a control logic for controlling a power management state of the individual storage tiles; and
a network for communicating the values among the tiles according to a movement heuristic, wherein the tiles include network circuits for interfacing with the network, wherein the control logic within the individual tiles measures an activity level at the individual storage tiles, wherein the activity levels are reflective of rate of the transfer of values between the individual tiles and other tiles over the network, wherein the internal network automatically transfers the values according to the movement heuristic to provide vacant storage locations for other values written to the storage circuit from an external device, wherein the control logic compares an activity level at the individual storage tiles to a threshold, maintains the individual storage tiles in a fully active state if their corresponding activity level is greater than or equal to the threshold, and places the individual storage tiles in a power-saving state if their corresponding activity level is less than the threshold, wherein the values stored in the tiles that are in the fully active state are transferred according to the movement heuristic to be stored in next tiles, and wherein the values transferred according to the movement heuristic bypass the tiles that are in the power-saving state without being stored in the tiles that are in the power-saving state.

13. The storage circuit of claim 12, wherein when the individual storage tiles are in the power-saving state, the control logic within the individual storage tiles forward push-in requests to a next tile toward a tail of the tiled storage device.

14. The storage circuit of claim 12, further comprising an interface that sends power management status requests to the individual storage tiles to query the individual tiles as to whether their control logic has determined that the activity of the individual storage tiles is less than the threshold and therefore the individual storage tiles are ready to enter the power-saving state, and wherein the individual storage tiles send responses to the interface indicating whether or not they are ready to enter the power-saving state.

15. The storage circuit of claim 14, wherein the interface, in response to receiving a response indicating that a corresponding storage tile is ready to enter the power-saving state, further sends multiple requests to the corresponding storage tile to push-back dirty values to a push-back interface, and sends a command to the corresponding storage tile to enter the power-saving state, and wherein the control logic of the individual storage tiles only places the individual storage tiles in the power-saving state in response to receiving the command.

16. The storage circuit of claim 15, wherein the interface, subsequent to the sending of the multiple requests to the corresponding storage tile to push-back dirty values, waits a predetermined period for the dirty values to enter a push-back queue, determines whether the push-back queue has a predetermined number of open entries, and wherein the interface sends the command only in response to determining that the push-back queue has a predetermined number of open entries after the multiple requests have been sent.

17. The storage circuit of claim method of claim 14, wherein the individual storage tiles further send responses to the interface indicating whether or not they are ready to leave the power-saving state.

18. The storage circuit of claim 17, wherein the interface, in response to receiving a response that a corresponding storage tile is ready to leave the power-saving state, sends a command to the corresponding storage tile to leave the power-saving state.

19. The storage circuit of claim 12, wherein the activity level at the individual storage tiles is a corresponding hit rate of the individual storage tiles and the threshold is a hit threshold.

20. The storage circuit of claim 19, wherein the determining further determines whether a corresponding push-back rate at the individual storage tiles is less than a push-back threshold, and wherein the control logic places the individual storage tiles in the power-saving state only if their corresponding push-back rate is less that the push-back threshold in addition to the corresponding hit rate being less than the hit threshold.

21. The storage circuit of claim 12, wherein when the individual storage tiles are in the power-saving state, the control logic within the individual storage tiles further determines whether or not the individual storage tiles should leave the power-saving state by measuring the activity level at the individual storage tiles and comparing the activity level to an inactivity threshold.

22. The storage circuit of claim 21, wherein the activity level at the individual storage tiles while the individual storage tiles are in the power-saving state is a corresponding push-back rate of the individual storage tiles and wherein the inactivity threshold is a push-back threshold.

23. A method of power managing a spiral cache memory comprising a plurality of storage tiles, the method comprising:
moving values stored within the plurality of storage tiles according to a movement heuristic via an internal network of the spiral cache memory to automatically transfer the values according to the movement heuristic to provide vacant storage locations for other values written to the spiral cache memory from an external device,
for storage tiles within the spiral cache memory that are in a fully active state, measuring a hit rate and a push-back rate at the storage tiles, comparing the push-back rate to a push-back threshold and the hit rate to a hit threshold, wherein the push-back rate is a rate of internal transfer among the storage tiles within the spiral cache memory in a direction toward an external backing store, and readying the storage tiles to enter a power-saving state if the push-back rate is less than the push-back threshold and the hit rate is less than the hit threshold; and
for storage tiles in a power-saving state, measuring a push-back rate at the storage tiles, comparing the push-back rate to a second push-back threshold, and placing the storage tiles in the fully active state if the push-back rate is greater than the second push-back threshold, wherein the values stored in the tiles that are in the fully active state are transferred according to the movement heuristic to be stored in next tiles, and wherein the values transferred according to the movement heuristic bypass the tiles that are in the power-saving state without being stored in the tiles that are in the power-saving state.

24. The method of claim 23, further comprising:
sending power management status requests to the individual storage tiles to query the individual tiles as to whether the individual tiles are ready to enter the power-saving state; and
sending responses from the individual storage tiles indicating whether or not they are ready to enter the power-saving state;
responsive to receiving a response that a corresponding storage tile is ready to enter the power-saving state, sending multiple requests to the corresponding storage tile to push-back dirty values to a push-back interface; and
sending a command to the corresponding storage tile to enter the power-saving state, and wherein the placing the individual storage tiles in the power-saving state is further performed only in response to receiving the command.

25. The method of claim 24, further comprising:
subsequent to the sending of the multiple requests to the corresponding storage tile to push-back dirty values, waiting a predetermined period for the dirty values to enter a push-back queue; and
determining whether the push-back queue has a predetermined number of open entries, and wherein the sending a command is performed only in response to determining that the push-back queue has a predetermined number of open entries after the multiple requests have been sent.

\* \* \* \* \*